June 21, 1932.   W. F. HENDERSON   1,864,245
IMITATION SAUSAGES FOR DISPLAY
Filed Nov. 19, 1930
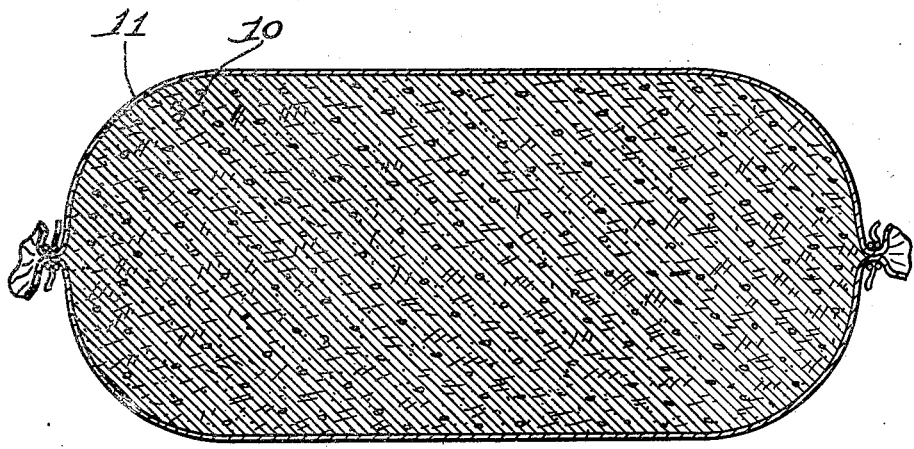
Inventor.
William F. Henderson.
By Dyrenforth, Lee, Chritton & Wiles
Attys.

Patented June 21, 1932

1,864,245

UNITED STATES PATENT OFFICE

WILLIAM F. HENDERSON, OF CHICAGO, ILLINOIS, ASSIGNOR TO THE VISKING CORPORATION, OF CHICAGO, ILLINOIS, A CORPORATION OF VIRGINIA

IMITATION SAUSAGES FOR DISPLAY

Application filed November 19, 1930. Serial No. 496,783.

The invention relates to imitation sausages adapted to be displayed to advertise certain brands thereof, or casing for such products, and a primary object of the invention is to provide an imitation sausage which will have the appearance of the sausage or casing which is being advertised.

Imitation sausages embodying a preferred form of the invention are formed from a mixture of dyed sawdust and paraffin which is enclosed in an artificial sausage casing, the casing being formed from cellulose by practicing the method briefly described in U. S. Letters Patent No. 1,612,508, granted to William F Henderson and Harold E. Dietrich, December 28, 1926. Prior to stuffing the casing, it is thoroughly soaked in diluted glycerine. Also a small amount of paraffin oil is distributed over the inside surface thereof and a thin film of vaseline is rubbed over the outside surface of the body portion of the sausage. After the imitation sausage has been prepared, it is dried to shrink the casing. The glycerine prevents the casing from drying too completely and cracking.

Many other objects and advantages will become apparent as the following detailed description progresses, reference being made to the accompanying drawing wherein the figure is a longitudinal section taken through an imitation sausage embodying the invention.

In preparing the stuffing for the imitation sausage, any suitable material may be employed, but I preferably dye ordinary pine sawdust a bright red color by employing any water soluble dye of the proper shade. After separating the sawdust from the dye liquor, it is spread out until it has dried thoroughly. The dried sawdust is stirred into melted paraffin until a mixture having the consistency of a thick paste is secured. The temperature of the mixture is then raised above 100° C. for several hours to drive out moisture and air and to cause the melted paraffin to penetrate the sawdust. Care is exercised to avoid intense local heating from any flame as too high a temperature darkens the mixture by charring the sawdust and ruins the color of the preparation.

In a preferred embodiment of the invention, the materials are employed in the following proportions:

Air dried colored sawdust_____ 1 part
Paraffin_____ 3 parts

This mixture is preferably heated at 80° to 90° C. for a period of three hours and then at 110° C. for a period of two hours. The material is packed into a mold while hot and allowed to cool after which the mold is removed and any surface imperfections are "touched up". The sausage is then ready to be covered with the casing.

The casings for which this imitation sausage is primarily intended, are those made from regenerated cellulose. These casings are made in various sizes and the size of the imitation sausage must be suitable to the size of the casing which is to be displayed. The casing is thoroughly soaked in dilute glycerine (20% glycerine and 80% water is preferred) and one end thereof is tied up in the customary manner. A small amount of paraffin oil is then distributed over the inside surface of the casing and the outside surface of the body portion is covered with a thin film of vaseline. The wet casing is then slipped on the body portion and drawn very tight, the air being massaged out of the casing during this operation. The open end is then drawn tight and tied with a cord, or the equivalent, care being exercised not to cut the casing.

The imitation sausage is then dried. This operation causes shrinkage which draws the casing down against the sawdust body and results in a smooth, perfectly fitting covering for the sawdust body. In the drawing, the sawdust body is indicated at 10 and the casing at 11.

The above described method of forming a smooth sausage for display purposes is particularly advantageous when the casing is to bear the name or trademark of the dealer.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

What I regard as new, and desire to secure by Letters Patent, is:

1. A method of producing an imitation sausage for display purposes, which method comprises dyeing a granular substance, mixing the dyed substance to produce a pasty mass, cooling said mass in a mold, and then covering the molded mass with a sausage casing.

2. A method of producing an imitation sausage for display purposes, which method comprises dyeing sawdust, mixing the dyed sawdust with melted paraffin, cooling the mixture in a mold, and covering the molded mass with a sausage casing.

3. A method of producing an imitation sausage for display purposes, which method comprises preparing a mixture of a dyed substance and a melted substance, heating said mixture to a temperature above 80° centigrade, and cooling said mixture in a mold.

4. A method of producing an imitation sausage for display purposes, which method comprises preparing a mixture of a dyed substance and a melted substance, heating said mixture to a temperature above 80° centigrade, cooling said mixture in a mold, and covering the molded mixture with a sausage casing.

5. A method of producing an imitation sausage for display purposes, which method comprises preparing a mixture of a granular substance and a binder, heating said mixture to a temperature above 80° centigrade, cooling said mixture in a mold, and covering said cooled mixture with a sausage casing.

6. A method of producing an imitation sausage for display purposes, which method comprises molding a body portion, and then covering said body portion with a sausage casing.

7. A method of producing an imitation sausage for display purposes, which method comprises molding a body portion, and then covering said body portion with a cellulose sausage casing.

8. A method of producing an imitation sausage for display purposes, which method comprises molding a body portion from dyed material, treating a cellulose sausage casing wth glycerine, and enclosing said body portion in said casing.

9. A method of producing an imitation sausage for display purposes, which method comprises molding a body portion, treating a cellulose sausage casing with glycerine, coating the inner surface of the casing with paraffin oil, and enclosing the body portion in said casing.

10. A method of producing an imitation sausage for display purposes, which method comprises molding a body portion, treating a cellulose sausage casing with glycerine, coating the inside surface of said casing with paraffin oil, coating the outside surface of said body portion with vaseline, and enclosing said body portion in said casing.

11. A method of producing an imitation sausage for display purposes, which method comprises molding a body portion, treating a cellulose sausage casing with glycerine, coating the inside surface of said casing with paraffin oil, coating the outside surface of said body portion with vaseline, enclosing said body portion in said casing, and drying said assembled body portion and casing.

12. A method of producing an imitation sausage for display purposes, which method comprises dyeing sawdust, mixing said dyed sawdust with melted paraffin, heating said mixture to evaporate moisture therefrom, cooling said mixture in a mold, and covering said cooled mixture with a sausage casing.

13. An imitation sausage for display purposes comprising a body portion formed from sawdust, and a binder, and a casing for said body portion.

14. An imitation sausage for display purposes comprising a body portion formed from dyed sawdust and a binder, and a sausage casing for said body portion.

15. An imitation sausage for display purposes comprising a body portion formed from dyed sawdust and a binder, and a cellulose sausage casing for said body portion.

16. A method of producing an imitation sausage for display purposes, which method comprises forming a body portion of inedible material, and then covering said body portion with a sausage casing.

17. A method of producing an imitation sausage for display purposes, which method comprises forming a body portion from inedible material, and then covering said body portion with a cellulose sausage casing.

In testimony whereof, I have hereunto affixed my signature, this 24th day of October, 1930.

WILLIAM F. HENDERSON.